United States Patent Office 3,474,025
Patented Oct. 21, 1969

3,474,025
SHAPE SELECTIVE HYDROCARBON CONVERSION OVER ACTIVATED OFFRETITE
William E. Garwood, Haddonfield, N.J., assignor to Mobil Oil Corporation, a corporation of New York
No Drawing. Filed Apr. 28, 1967, Ser. No. 634,481
Int. Cl. C10g 11/04
U.S. Cl. 208—111               4 Claims

ABSTRACT OF THE DISCLOSURE

Offretite, a crystalline aluminosilicate, activated by the insertion of rare earth ions, used for shape-selective conversions of n-alkanes and n-alkenes in the presence of hydrogen, but in the absence of hydrogenation catalyst.

SUMMARY

This invention is directed to the shape-selective conversion of normal alkanes and alkenes, such as occur in petroleum hydrocarbon fractions, over offretite, both natural and synthetic, which has been activated by the introduction thereinto of rare earth cations. The conversions are conducted in the presence of a hydrogen atmosphere, and at conditions of about the same order as in hydrocracking, but in the absence of any hydrogenating catalyst, such as metal of the platinum group, nickel, etc., used as hydrogenating - dehydrogenating catalysts. Regeneration may be by oxidation or by hydrogen treatment, the latter being preferred.

DESCRIPTION OF THE INVENTION

Oretite occurs in natural form, its formula being given in the literature as:

$$(Ca, Mg, Na_2, K_2)4.5:(Al_9Si_{27}O_{72}):27H_2O$$

also:

$$(Ca, Mg, Na_2, K_2)1:Al_2O_3:6SiO_2:6H_2O$$

and it will be noted that the two forms of expression are identical, and may be reduced, for the sodium form to:

$$Na_2O:Al_2O_3:6SiO_2:6H_2O$$

A synthetic form of the material, prepared according to U.S. Patent 2,950,952, has the formula:

$$1.1 \pm 0.4[xNa_2O:(1-x)K_2O]:Al_2O_3:6.9 \pm 0.5SiO_2:yH_2O$$

wherein $x$ is from about 0.1 to about 0.8 and $y$ is from 0 to about 8. This material is also known as zeolite T.

The materials are shape selective, accepting the normal alkanes and alkenes, as will be shown later.

These materials may be activated for the present purposes by base exchanging to insert into their crystalline structure, instead of the alkali metals, rare earth metal cations. While a specific preparation is shown herein, the methods of exchange are discussed fully in Plank and Rosinski, U.S. Patents 3,140,251; 3,140,252; 3,140,-253 and elsewhere. The materials may be used alone, or combined with a matrix of amorphous silica alumina, clays, or inerts, as shown, for example in Plank and Rosinski, U.S. Patent 3,140,249.

CATALYST PREPARATION AND PROPERTIES

For the following series of experiments, a catalyst was prepared in the following manner. One pound of natural offretite was hammer-milled. Then 360 pounds of an aqueous solution having a 5% concentration of the hexahydrates of mixed rare earth chlorides and a 2% concentration of ammonium chloride was used in continuous base exchange at a temperature of 180° F. for a period of 13 days. After this the aluminosilicate was washed free of chloride ion at 180° F., dried at 230° F., and calcined for 10 hours at a temperature of 1000° F.

|  | Natural Offretite | RareEarth Exchanged Offretite |
|---|---|---|
| $Al_2O_3$, wt. percent | 15.4 | 15.4 |
| K, wt. percent | 3.7 | 2.9 |
| Na, wt. percent | 3.3 | 0.08 |
| $RE_2O_3$, wt. percent |  | 6.24 |

Experiment 1

To show the shape-selectivity of this material, it was used in adsorption tests with n-hexane and cyclohexane.

|  | Wt. percent |
|---|---|
| n-Hexane adsorbed | 6.7 |
| Cyclohexane adsorbed | 0.6 |

Experiment 2

The catalyst so prepared was used for the cracking of normal hexadecane, operating at a temperature of 750° F., a pressure of 2000 p.s.i.g., a liquid hourly space velocity (LHSV), of 0.62, in the presence of hydrogen at a molar ratio of H/HC=30/1, with no platinum or similar hydrogenating catalyst ingredient. Additionally, to demonstrate the recovery capabilities of this catalyst, after four hours run, the hydrogen atmosphere was completely replaced by a like concentration of nitrogen, with a severe drop in activity. After two hours of the nitrogen run, the system was changed back to the original hydrogen concentration (no nitrogen) and a sharp recovery of activity was found.

| Atmosphere | Hydrogen | Nitrogen | Hydrogen |
|---|---|---|---|
| Temperature, ° F | 750 | 750 | 750 |
| Run Period, hrs | 4 | 2 | 2 |
| Conv. of n-$C_{16}$, wt. percent | ~97 | 7 | 33 |

The above noted recovery of activity in an atmosphere of hydrogen after an exposure to nitrogen, (as would occur in an oxidizing regeneration) is confined to rare earth activated offretite, as demonstrated by the following experiment.

Experiment 3

A synthetic offretite, prepared according to the method described in U.S. Patent 2,905,952 was base exchanged with a solution of ammonium chloride to arrive at a sodium content of 0.1 wt. percent potassium content of 2.3 wt. percent, then calcined, and used without steaming under same conditions as shown in Experiment 2.

|  | $H_2$ | $H_2$ | $N_2$ | $H_2$ |
|---|---|---|---|---|
| Atmosphere: |  |  |  |  |
| Temperature, ° F | 750 | 750 | 750 | 750 |
| Run Period, hrs | 3 | 4 | 3 | 4 |
| Conv. of n-$C_{16}$, wt. percent | 37 | 34 | 6 | 14 |

From the above it may be seen that the H-offretite is not only much less active than the rare-earth form, even when fresh, and fails signally in ability to recover initial activity after exposure to nitrogen atmosphere.

The conversion conditions resemble those of hydrocracking, except for the presence in hydrocracking and the absence in the processes of this invention of the usual hydrogenating-dehydrogenating catalyst ingredients. The reaction here is not one of hydrogenation, as may be demonstrated by using a similar catalyst, but having a wider adsorption capability.

Experiment 4

The catalyst used here was made by base-exchanging a 13X aluminosilicate with a solution containing 5 wt. percent of mixed rare earth chloride hexahydrates and 2 wt. percent of ammonium chloride for a period sufficient to introduce into the aluminosilicate 24 wt. percent of rare earth cations, (measured as $RE_2O_3$). After washing free of chloride ion and drying, it was calcined in air for 16 hours at 1000° F.

It was then utilized in cracking a heavy gas oil, (IBP 646° F., 95%, 961° F., vacuum assay), at a temperature of 704° F., liquid hourly space velocity, (LHSV), of 0.5, pressure 2000 p.s.i.g., hydrogen 3000 s.c.f. per barrel of charge, and no hydrogenating catalyst component.

Since typical aspects of hydrogenation operations are a high consumption of hydrogen and a conversion and removal of sulphur and nitrogen compounds, these aspects of the operation were examined. With a conversion of the charge to products boiling below 650° F., amounting to about 26 vol. percent, the consumption of hydrogen was only 250 s.c.f. per barrel of charge, and the sulphur and nitrogen results were as follows:

| Time, hrs.[1] | Charge | 24-28 | 44-48 | 68-72 |
|---|---|---|---|---|
| Sulphur, wt. percent | 0.64 | 0.57 | 0.59 | 0.57 |
| Percent removal | | 11 | 8 | 11 |
| Nitrogen, wt. percent | 0.11 | 0.07 | 0.09 | 0.09 |
| Percent removal | | 36 | 18 | 18 |

[1] Period in a continuous run at which material balances were made.

Additionally, the 390° F. product had a diesel index of 49.5 as compared to 49.1 for the charge, showing essentially no saturation.

Experiment 5

To further examine the nature of the cracking over the rare earth offretite prepared from the natural offretite, it was utilized for cracking a blend made up of equal parts, by weight, (20%), of n-octane, n-decane, n-dodecane, n-tetradecane and n-hexadecane. The various operations were conducted at the same LHSV of 0.62, molar ratio hydrogen to hydrocarbon, H/HC, of 30/1, at the temperatures indicated and a pressure of 2000 p.s.i.g., with a parallel set of operations at a pressure of 200 p.s.i.g., and alternating hydrogen and nitrogen atmospheres.

The results of these runs are set forth in Table I, in which several interesting things are apparent. First, at columns 1, 2 and 3, we note that at 750° F. a conversion of approximately 97% occurs, while at 700° F. the conversion is most pronounced with the lighter constituents, and much less, while at 600° F. it is very much diminished, with nil conversion of the hexadecane. In columns 4, 5 and 6, at temperatures of 850° F. and a much higher space velocity of 2, the same tendency to crack the lighter constituents is noted, as is the good recovery of total conversion in a hydrogen atmosphere after exposure to nitrogen, although conversion of hexadecane is still low, having been nil during the nitrogen operation. Also notable is the predominance of $C_3$ cracked products, a characteristic of shape selective cracking.

TABLE I

| | Column | | | | | |
|---|---|---|---|---|---|---|
| | 1 | 2 | 3 | 4 | 5 | 6 |
| Pressure, p.s.i.g | 2,000 | 2,000 | 2,000 | 200 | 200 | 200 |
| Atmosphere | $H_2$ | $H_2$ | $H_2$ | $H_2$ | $N_2$ | $H_2$ |
| LHSV | 0.62 | 0.62 | 0.62 | 2.0 | 2.0 | 2.0 |
| Temperature, °F | 750 | 700 | 650 | 850 | 850 | 850 |
| Run Period, hrs | 2 | 3 | 3 | 1 | 2 | 2 |
| Avg. Conv., wt. percent | ~97 | 69 | 17 | 31 | 10 | 24 |
| Conversion of Constituents, Wt. percent: | | | | | | |
| n-$C_8$ | | 99 | 35 | 51 | 22 | 48 |
| n-$C_{10}$ | | 96 | 31 | 37 | 14 | 33 |
| n-$C_{12}$ | | 80 | 11 | 23 | 10 | 19 |
| n-$C_{14}$ | | 43 | 10 | 25 | 3 | 13 |
| n-$C_{16}$ | | 26 | Nil | 20 | Nil | 5 |
| Distribution of Cracked Products, Wt. percent: | | | | | | |
| $C_1$ | 6 | 3 | <1 | 1 | <1 | 1 |
| $C_2$ | 9 | 3 | 1 | 3 | <1 | 4 |
| $C_3$ | 62 | 42 | 10 | 21 | 7 | 15 |
| $C_4$ | 19 | 18 | 5 | 4 | 3 | 4 |
| $C_5$ | 1 | 3 | 2 | 2 | <1 | <1 |
| $C_6$ | <1 | <1 | <1 | <1 | <1 | <1 |
| $C_7$ | <1 | <1 | <1 | <1 | <1 | <1 |
| $C_{9, 11, 13, 15}$ | <1 | <1 | <1 | <1 | <1 | <1 |

Experiment 6

Still using the catalyst prepared from natural offretite, the results of cracking a highly paraffinic jet fuel were observed. The fuel charged here had the following properties:

| | |
|---|---|
| Gravity, API | 53.0 |
| Gravity, specific | 0.7669 |
| ASTM Dist., ° F.: | |
| IBP | 398 |
| 5% | 408 |
| 10% | 410 |
| 20% | 414 |
| 50% | 426 |
| 90% | 460 |
| EP | 494 |
| Aniline No., ° F. | 181.8 |
| Freeze point, ° F. | -41 |
| Pour point, ° F. | -40 |
| Composition, wt. percent: | |
| Paraffins | 90 |
| Naphthenes | 8 |
| Aromatics | 2 |

Cracking at the indicated temperatures, pressure of 200 p.s.i.g., LHSV of 2, and mol ratio hydrogen/hydrocarbon of 27/1, the results were:

| | Temperature | | |
|---|---|---|---|
| | 850 | 800 | 750 |
| Run Period, hrs | 3 | 3 | 3 |
| Conversion, wt. percent | 19 | 12 | 9 |
| Cracked Product, wt. percent: | | | |
| $C_1$ | 1 | <1 | <1 |
| $C_2$ | 4 | 1 | 1 |
| $C_3$ | 9 | 7 | 5 |
| $C_4$ | 2 | 2 | 1 |
| $C_5$ | <1 | <1 | <1 |
| $C_6$—358° F. naphtha | 3 | 2 | 2 |

Comparing the charge and the resulting remainder fuel.

| | Charge | | | |
|---|---|---|---|---|
| Gravity, API | 53.0 | 52.8 | 53.1 | 53.1 |
| Aniline No | 181.8 | 182.5 | 183.2 | 183.0 |
| Freeze Point, ° F | -41 | -46 | -39 | -37 |
| Pour Point, ° F | -40 | -60 | -50 | -45 |

Consideration of the above data indicates that with proper conversion conditions, this catalyst can be used to substantially lower the pour point of jet fuels, with a somewhat lesser effect upon the freeze point.

The depression of pour points will be dependent upon the relative amounts of normal paraffins and iso-paraffins in the stock treated, as well as the molecular weight of the normal paraffins, since the normal paraffins of high molecular weight do not appear to be converted as readily as those of lower molecular weight. This last is apparent in the freeze point data, since the paraffins of high molecular weight are, of course, the first to crystallize.

Experiments 7 and 8

To examine the effect of this catalyst in cracking heavy gas oils, two stocks were charged. For Experiment 7, the stock was a heavy gas oil from Kuwait Crude, a stock of lubricant characteristics, which had been furfural extracted but not dewaxed, having a carbon number range $C_{20}$-$C_{36}^+$, specific gravity 0.8713, +95° F. pour point. The second, Experiment 8, was an unrefined gas oil from Amal. Crude, boiling 598° to about 1100° F. (vacuum asay) specific gravity 0.8735, +115° F. pour point.

|  | Experiment 7 | | Experiment 8 | |
|---|---|---|---|---|
| Charge | Kuwait waxy raffinate | | Amal gas oil | |
| Pressure, p.s.i.g | 200 | 200 | 2,000 | 2,000 | 2,000 |
| LHSV | 2 | 2 | 0.5 | 0.5 | 0.5 |
| H/HC mol. ratio | 43/1 | 43/1 | 43/1 | 30/1 | 30/1 |
| Temperature, °F | 750 | 800 | 800 | 750 | 800 |
| Run period, hrs | 3 | 3 | 5 | 5 | 5 |
| Products, wt. percent: | | | | | |
| $C_1$ | <1 | <1 | 6 | 1 | 3 |
| $C_2$ | 1 | 1 | 6 | 1 | 3 |
| $C_3$ | 2 | 5 | 26 | 6 | 9 |
| $C_4$ | 1 | 2 | 6 | 1 | 1 |
| $C_5$ | <1 | <1 | 1 | <1 | <1 |
| $C_6^+$ | 96 | 92 | 55 | 91 | 84 |
| Pour point $C_6^+$ | +95 | +95 | ¹<+75 | +110 | +105 |

¹ Sample size not sufficient for more accurate determination.

The above data indicate that pour point is reduced only at high conversions. Apparently this reaction system is not practical for pour point reduction of stocks of greater than 600° F. boiling range. However, there is indicated a continued high selectively for making $C_3$ cracked product. Thus a wide variety of crude fractions may be converted to the $C_3$ and liquifiable petroleum gas products, which are tending toward high demand, without the high hydrogen consumption and aging of transition metal catalyst ingredients which are experienced in conventional hydrocracking.

In general, the consumption of hydrogen in these conversions is quite low, being not above about 300 s.c.f. per barrel of charge, in contrast to the much higher consumption experienced in the presence of hydrogenating catalysts.

From the above data it will be seen that there is here provided, by shape-selective cracking in the presence of offretite activated by the introduction thereinto of rare earth cations, in the presence of hydrogen, but in the complete absence of catalytic ingredients such as Pt and the transition metals customarily utilized in hydrocracking, a process for the conversion of alkanes and alkenes. Characteristic of the process and of the catalyst is a low consumption of hydrogen in the conversions, and a capability of catalyst activity recovery by either a combustion process where nitrogen is present, or, more preferably by hydrogen regeneration.

The commercial aspects of the reaction encompass shape-selective conversion of n-paraffins in kerosenes, jet fuels, and some gas oils to give lowered pour points, treatment of jet fuels to clear up haze, and production of $C_3S$ and related fractions for Liquifiable Petroleum Gases from a wide variety of petroleum stocks.

While the above-noted conversions are mostly those of normal alkanes, normal alkenes can be subjected to such conversions as cracking, double bond isomerization, and hydrogen exchange with n-alkanes. Skeletal isomerization (to iso-compounds) is not to be expected.

The conditions of operation, except for the absence of a hydrogenation catalyst such as Pt, the transition metals, etc., are generally the same as those for hydrocracking. A practical range of temperatures is from about 400° F. to about 850° F., for pressures 100–2500 p.s.i.g., liquid hourly space velocities, LHSV, of 0.1 to 50, and hydrogen to hydrocarbon mol ratios of 2–80.

The preferred ranges of operating conditions are as follows: Temperature 600–750° F.; pressure 500 to 2000 p.s.i.g.; liquid hourly space velocities 0.5–10; hydrogen to hydrocarbon mol ratios 5–50.

With respect to the catalyst, the extent of the replacement of alkali metals, or of alkaline earth metals in the starting offretite compound, calculated as the percentage of aluminum sites occupied by rare earth cations should not be lower than 10%, with a preferred level of at least about 25%. The catalyst prepared for use in Example 1 has a replacement of about 38% (6.24 $RE_2O_3$, wt. percent, 15.4 $Al_2O_3$, wt. percent).

What is claimed is:

1. That method for the shape-selective conversion of straight-chain hydrocarbons in hydrocarbon mixtures containing them which comprises:

contacting the hydrocarbons with a contact mass the active portion of which consists essentially of the crystalline aluminosilicate offretite having a ratio of $SiO_2/Al_2O_3$ within the range of from about 6 to about 7 and which is shape-selective for straight chain hydrocarbons and which has been activated by incorporating rare earth cations into its crystalline structure to the extent of occupying at least 10 percent of the aluminum sites and in the absence of hydrogenation-dehydrogenation catalytic metal components, at temperatures ranging from about 400° F. to about 850° F., at pressures of from about 100 to about 2500 p.s.i.g., at liquid hourly space velocities of from about 0.1 to about 50, and in the presence of hydrogn at hydrogen to hydrocarbon mol ratios of from about 2 to about 80, the consumption of hydrogen being not above about 300 s.c.f. per barrel of charge stock.

2. That method for the shape-selective conversion of straight-chain hydrocarbons in hydrocarbon mixtures containing them which comprises:

contacting the hydrocarbons with a contact mass the active portion of which consists essentially of the crystalline aluminosilicate offretite having a ratio of $SiO_2/Al_2O_3$ within the range of from about 6 to about 7 and which is shape-selective for straight chain hydrocarbons and which has been activated by incorporating rare earth cations into its crystalline structure to the extent of occupying at least about 25 percent of the aluminum sites and in the absence of hydrogeneration-dehydrogenation catalytic metal components, at temperatures ranging from about 600° F. to about 850° F., at pressures of from about 500 to about 2000 p.s.i.g., at liquid hourly space velocities of from about 0.5 to about 10, and in the presence of hydrogen at hydrogen to hydrocarbon mol ratios of from about 5 to about 50, the consumption of hydrogen being not above about 300 s.c.f. per barrel of charge stock.

3. That method of treating a distillate hydrocarbon fraction such as kerosene, jet fuel, and the like, to minimize the amount of straight-chain hydrocarbons contained therein which consists of:

contacting the distillate with a contact mass the active portion of which consists essentially of the crystalline aluminosilicate offretite having a ratio of $SiO_2/Al_2O_3$ within the range of from about 6 to about 7 and which is shape-selective for straight chain hydrocarbons and which has been activated by incorporating rare earth cations into its crystalline structure to the extent of occupying at least about 25 percent of the aluminum sites and in the absence of hydrogenation-dehydrogenation catalytic metal components, at temperatures ranging from about 750° F. to about 850° F., at pressures of from about 100 to about 500 p.s.i.g., at liquid hourly space velocities of from about 1.0 to about 5.0, and in the presence of hydrogen at hydrogen to hydrocarbon mol ratios of from about 10 to about 40, the consumption of hydrogen being not above about 300 s.c.f. per barrel of charge stock.

4. That method of treating high-boiling petroleum fractions containing straight-chain hydrocarbons to produce from them substantial quantities of low-boiling, liquefiable petroleum gas fractions which consist of:

contacting the petroleum fraction with a contact mass the active portion of which consists essentially of the crystalline aluminosilicate offretite having a ratio of $SiO_2/Al_2O_3$ within the range of from about 6 to about 7 and which is shape-selective for straight chain hydrocarbons and which has been activated by incorporating rare earth cations into its crystalline structure to the extent of occupying at least about 25 percent of the aluminum sites and in the absence of hydrogenation-dehydrogenation catalytic metal components, at temperatures ranging from about 750° F. to about 850° F., at pressures of from about 100 to about 2000 p.s.i.g., at liquid hourly space velocities of from about 0.5 to about 5.0, and in the presence of hydrogen at hydrogen to hydrocarbon mol ratios of from about 20 to about 50, the consumption of hydrogen being not above about 300 s.c.f. per barrel of charge stock.

References Cited

UNITED STATES PATENTS

| | | | |
|---|---|---|---|
| 2,950,952 | 8/1960 | Breck et al. | 23—113 |
| 3,130,006 | 4/1964 | Rabo et al. | 23—110 |
| 3,140,253 | 7/1964 | Plank et al. | 208—120 |
| 3,210,267 | 10/1965 | Plank et al. | 208—120 |

DELBERT E. GANTZ, Primary Examiner

A. RIMENS, Assistant Examiner

U.S. Cl. X.R.

252—455

PO-1050
(5/69)

UNITED STATES PATENT OFFICE
CERTIFICATE OF CORRECTION

Patent No. 3,474,025          Dated 10/21/69

Inventor(s) WILLIAM E. GARWOOD

It is certified that error appears in the above-identified patent and that said Letters Patent are hereby corrected as shown below:

| | |
|---|---|
| Column 1, line 33 | "Oretite" should be --Offretite-- |
| Column 1, line 50 | "The" should be --These-- |
| Column 5, line 18 | "selectively" should be --selectivity-- |
| Column 6, line 35 | "850°F." should be --750°F.-- |

SIGNED AND
SEALED
FEB 17 1970

(SEAL)
Attest:

Edward M. Fletcher, Jr.
Attesting Officer

WILLIAM E. SCHUYLER, JR.
Commissioner of Patents